United States Patent [19]

Nagata et al.

[11] Patent Number: 5,494,864
[45] Date of Patent: Feb. 27, 1996

[54] RESISTIVE PASTE

[75] Inventors: Keisuke Nagata; Hiroji Tani, both of Kyoto, Japan

[73] Assignee: Murata Manufacturing Co., Ltd., Japan

[21] Appl. No.: 315,120

[22] Filed: Sep. 29, 1994

Related U.S. Application Data

[62] Division of Ser. No. 69,149, May 28, 1993, Pat. No. 5,397,751.

[30] Foreign Application Priority Data

May 28, 1992 [JP] Japan .................... 4-136889

[51] Int. Cl.$^6$ .................................. C03C 8/14
[52] U.S. Cl. .................. 501/20; 501/17; 501/32; 501/96; 501/152; 252/518; 252/521
[58] Field of Search ................ 501/17, 20, 32, 501/96, 98, 152; 252/521, 518

[56] References Cited

U.S. PATENT DOCUMENTS 4,985,176  1/1991  Watanabe et al. .................... 501/17
5,036,027  6/1991  Watanabe et al. .................... 501/96

Primary Examiner—Mark L. Bell
Assistant Examiner—Michael Marcheschi
Attorney, Agent, or Firm—Ostrolenk, Faber, Gerb & Soffen

[57] ABSTRACT

A resistive paste comprising (a) a mixture of a resistive material having a composition of $Nb_xLa_{1-x}B_{6-4x}$, wherein x is from 0.1 to 0.9 mol, and non-reducing glass frit, (b) at least one additive selected from the group consisting of $B_2O_3$, $SiO_2$, $Al_2O_3$, CrB, NiB, $TaSi_2$, and Ta in an amount of from 1 to 10% by weight based on said mixture (a), and (c) an organic vehicle, and a resistive paste comprising (a) a mixture of a resistive material having a composition of $Nb_xLa_{1-x}B_{6-4x}$, wherein x is from 0.1 to 0.9 mol, and non-reducing glass frit, (b) AlN in an amount of from 5 to 25% by weight based on said mixture (a), and (c) an organic vehicle. The resistive pastes provide a resistor having its temperature coefficient of resistivity shifted to the plus (+) direction in a high surface resistivity range.

5 Claims, No Drawings

RESISTIVE PASTE

This is a division of application Ser. No. 08/069,149, filed May 28, 1993 and now U.S. Pat. No. 5,397,751.

FIELD OF THE INVENTION

The present invention relates to a resistive paste which can be baked in a neutral or reducing atmosphere.

BACKGROUND OF THE INVENTION

A circuit pattern, which is composed of electrodes on which various electronic parts are mounted and resistors, has been generally formed on a ceramic base made of alumina, zirconia, etc., and the electrodes are generally formed by screen printing a conductive paste containing a noble metal, e.g., Ag or Ag—Pd, on the ceramic base followed by baking in air. Because of its expensiveness, the noble metallic paste has recently been displaced with a conductive paste containing a base metal, e.g., Cu, Ni or Al. In using such a base metallic paste, the screen-printed paste on a ceramic base is generally baked in a neutral or reducing atmosphere. If the base metallic paste is heated at high temperatures (i.e., baked) in an oxygen-containing atmosphere, such as air, a metal oxide would be formed which is an insulator. This is the reason why baking of a base metallic paste should be conducted in a neutral or reducing atmosphere.

When electrodes are formed by using such a base metallic paste, resistors which are arranged to bridge over the electrodes should also be formed by using a resistive paste which can be baked in a neutral or reducing atmosphere. Known resistive pastes which can be baked in a neutral or reducing atmosphere include $LaB_6$-based pastes, $NbB_2$-based pastes, and the resistive paste proposed by the present inventors and disclosed in U.S. Pat. No. 5,036,027. The paste described in U.S. Pat. No. 5,036,027 comprises a mixture of a resistive material having a composition of $Nb_xLa_{1-x}B_{6-4x}$ (wherein x is from 0.1 to 0.9 mol) and non-reducing glass frit, kneaded with an organic vehicle.

A desired surface resistivity over a broad range has been obtained by varying the mixing ratio of these resistive materials and glass frit. However, in using the $LaB_6$-based or $NbB_2$-based resistive pastes, the surface resistivity suffers drastic changes with a slight variation in glass frit amount, and satisfactory reproducibility cannot be assured. On the other hand, resistors formed of the $Nb_xLa_{1-x}B_{6-4x}$-based paste show a milder increase in surface resistivity than with those formed of the $LaB_6$-based pastes and $NbB_2$-based pastes. Therefore, the $Nb_xLa_{1-x}B_{6-4x}$-based paste has an advantage of a broadened surface resistivity range of from 10 Ω/square to 10MΩ/square by varying the mixing ratio of resistive material to glass frit. However, the resistors formed of the $Nb_xLa_{1-x}B_{6-4x}$-based paste, particularly those adjusted to have a high surface resistivity (e.g., from 1 kΩ/square to 10MΩ/square), sometimes undergo deterioration in temperature coefficient of resistivity (hereinafter abbreviated as "TCR"), i.e., shift of TCR in the minus (−) direction, and do not always satisfy the characteristics required for practical use.

SUMMARY OF THE INVENTION

An object of the present invention is to provide a resistive paste which can be baked in a neutral or reducing atmosphere and whose TCR in a high surface resistivity range can be shifted to the plus (+) direction.

Other objects and effects of the present invention will be apparent from the following description.

The present invention provides a resistive paste comprising (a) a mixture of a resistive material having a composition of $Nb_xLa_{1-x}B_{6-4x}$, wherein x is from 0.1 to 0.9 mol, and non-reducing glass frit, (b) at least one additive selected from the group consisting of $B_2O_3$, $SiO_2$, $Al_2O_3$, CrB, NiB, $TaSi_2$, and Ta in an amount of from 1 to 10% by weight based on the mixture (a), and (c) an organic vehicle.

The present invention also provides a resistive paste comprising (a) a mixture of a resistive material having a composition of $Nb_xLa_{1-x}B_{6-4x}$, wherein x is from 0.1 to 0.9 mol, and non-reducing glass frit, (b) AlN in an amount of from 5 to 25% by weight based on the mixture (a), and (c) an organic vehicle.

DETAILED DESCRIPTION OF THE INVENTION

In the present invention, $Nb_xLa_{1-x}B_{6-4x}$, wherein x is from 0.1 to 0.9 mol, preferably from 0.2 to 0.8 mol, is used as a resistive material. If x is less than 0.1 mol, it tends to be difficult to gradually increase the surface resistivity, while if x is more than 0.9 mol, the change rate of surface resistivity with the content of glass frit tends to become large, thus making it difficult to improve the reproducibility of the surface resistivity.

The grain size of the resistive material is generally from 0.1 to 5 μm. If the grain size is less than 0.1 μm, a prolonged period of grinding time is required to prepare the resistive material, and impurities introduced during the grinding tend to adversely affect the properties of the resistive material. If the grain size is more than 5 μm, it tends to be difficult to obtain a constant resistivity in a stable manner.

The resistive material can be prepared in any conventional manners, such as those described in U.S. Pat. No 5,036,027.

Examples of the non-reduced glass frit used in the present invention include alkali earth borosilicate, boroaluminosilicate, etc. The grain size of the non-reduced glass frit is generally from 1 to 10 μm. If the grain size is less than 1 μm, the change rate of surface resistivity tends to be too large, while if it is more than 10 μm, it tends to be difficult to obtain uniform resistors in a stable manner. The non-reduced glass frit can be prepared in any conventional manners, such as by mixing appropriate oxides followed by being fused.

The weight ratio of the resistive material to the non-reduced glass frit can be widely varied depending on the desired surface resistivity and the like, and is generally from 5/100 to 70/100 by weight in the present invention.

At least one additive selected from the group consisting of $B_2O_3$, $SiO_2$, $Al_2O_3$, CrB, NiB, $TaSi_2$, and Ta is added to the mixture of resistive material and glass frit in an amount of from 1 to 10% by weight, preferably from 2 to 8% by weight, based on the mixture. If it is less than 1% by weight, the effect of the additive would not be obtained, while if it is more than 10% by weight, the TCR becomes too small. Alternatively, AlN is added as an additive to the mixture of resistive material and glass frit in an amount of from 5 to 25% by weight, preferably from 10 to 20% by weight, based on the mixture. If it is less than 5% by weight, the effect of the additive would not be obtained, while if it is more than 25% by weight, the TCR becomes too small. The grain size of the additive is generally from 0.5 to 5 μm. If the grain size is outside this range, the effect of the additive tends to be insufficient, resulting in deterioration of the resulting resistor.

An organic vehicle is used for forming the resistive paste according to the present invention. Examples thereof include an acrylic resin and an ethylcellulose diluted with terpenes such as α-terpineol, β-terpineol or a mixture thereof with other solvents such as kerosine, butyl carbitol, butyl carbitol acetate and high boiling alcohols and alcohol esters. The organic vehicle should be thixotropic in order that it set up rapidly after being screened, thereby giving good resolution.

The resistive paste of the present invention can be produced in any conventional manner for preparing resistive pastes. For example, a resistive material and a glass frit, which have been separately prepared, are mixed with an additive, and the resulting mixture is kneaded with an organic vehicle to form a resistive paste according to the present invention.

The resistive paste of the present invention can be used in the similar manner as in conventional resistive pastes. For example, the resistive paste can be printed on a suitable base, such as a ceramic base, by screen printing, dried at 150° C. for 10 minutes, and then baked at a peak temperature at 900° C. for 10 minutes in a nitrogen atmosphere.

The surface resistivity of the resistor, which is formed from the resistive paste of the present invention, is not particularly limited and is generally from 1 kΩ/square to 10MΩ/square, and preferably from 2 kΩ/square to 1MΩ/square.

The present invention will be illustrated in greater detail with reference to the following Example, but it should be understood that the present invention is not construed as being limited thereto. All the percents are by weight unless otherwise indicated.

EXAMPLE

Preparation of Electrodes:

A conductive paste containing Cu as a base metal was screen printed on an alumina ceramic base and baked in a nitrogen atmosphere to form electrodes.

Preparation of Resistive Paste:

Powdered $NbB_2$ and $LaB_6$ were weighed and mixed to provide a composition of $Nb_xLa_{1-x}B_{6-4x}$, with x being varied between 0.1 mol and 0.9 mol as shown in Table 1 below. The mixture was calcined in a nitrogen atmosphere for 2 hours at a temperature increase rate of 3° C./min with the peak temperature set at 1000° C. to prepare a solid solution of $LaB_6$ in $NbB_2$. The resulting mixture was ground in a vibration mill to an average particle size of 1 μm and dried to obtain a resistive material having a composition of $Nb_xLa_{1-x}B_{6-4x}$ (x: 0.1 to 0.9 mol).

Separately, $B_2O_3$, $SiO_2$, BaO, CaO, $Nb_2O_5$, and $K_2O$ were mixed at a molar ratio of 35.56/31.24/17.78/10.04/2.41/2.97 and fused at a temperature of from 1,200° to 1,350° C. to prepare a fused glass. The fused glass was quenched in pure water and ground in a vibration mill to an average particle size of 5 μm or smaller to prepare a non-reducing glass frit.

$B_2O_3$, $SiO_2$, $Al_2O_3$, CrB, NiB, $TaSi_2$, Ta or AlN was added to a mixture composed of the resistive material and the non-reducing glass frit at a mixing ratio shown in Table 1 in a varied amount shown in Table 1.

The resulting mixture was kneaded with an organic vehicle composed of an acrylic resin diluted with α-terpineol to prepare a resistive paste.

TABLE 1

| Sample No. | x (mol) | Resistive material (wt %) | Glass frit (wt %) | Kind and amount of additive (wt %**) | |
|---|---|---|---|---|---|
| 1* | 0.25 | 10 | 90 | none | 0 |
| 2 | 0.25 | 10 | 90 | CrB | 3 |
| 3 | 0.25 | 10 | 90 | CrB | 7 |
| 4* | 0.25 | 10 | 90 | CrB | 12 |
| 5 | 0.25 | 10 | 90 | $TaSi_2$ | 3 |
| 6 | 0.25 | 10 | 90 | $TaSi_2$ | 7 |
| 7 | 0.25 | 10 | 90 | $B_2O_3$ | 3 |
| 8 | 0.25 | 10 | 90 | $SiO_2$ | 3 |
| 9 | 0.25 | 10 | 90 | $Al_2O_3$ | 7 |
| 10 | 0.25 | 10 | 90 | NiB | 7 |
| 11 | 0.25 | 10 | 90 | Ta | 7 |
| 12 | 0.25 | 10 | 90 | AlN | 10 |
| 13 | 0.25 | 10 | 90 | AlN | 20 |
| 14* | 0.25 | 10 | 90 | AlN | 30 |
| 15* | 0.75 | 15 | 85 | none | 0 |
| 16 | 0.75 | 15 | 85 | CrB | 3 |
| 17 | 0.75 | 15 | 85 | CrB | 7 |
| 18* | 0.75 | 15 | 85 | CrB | 12 |
| 19 | 0.75 | 15 | 85 | $TaSi_2$ | 3 |
| 20 | 0.75 | 15 | 85 | $TaSi_2$ | 7 |
| 21 | 0.75 | 15 | 85 | $B_2O_3$ | 3 |
| 22 | 0.75 | 15 | 85 | $SiO_2$ | 3 |
| 23 | 0.75 | 15 | 85 | $Al_2O_3$ | 7 |
| 24 | 0.75 | 15 | 85 | NiB | 7 |
| 25 | 0.75 | 15 | 85 | Ta | 7 |
| 26 | 0.75 | 15 | 85 | AlN | 10 |
| 27 | 0.75 | 15 | 85 | AlN | 20 |
| 28* | 0.75 | 15 | 85 | AlN | 30 |

Note:
*: Samples out of the scope of the present invention.
**: Based on the mixture of resistive material and glass frit.

Preparation of Resistor:

Each of the resistive pastes was screen printed on the ceramic base in a size of 1.5 mm long and 1.5 mm wide including a part of the electrode between electrodes, dried at 150° C. for 10 minutes, and baked in a nitrogen atmosphere with its peak temperature set at 900° C. for 10 minutes to form a resistor.

Evaluation:

The surface resistivity and TCR of each sample thus prepared were measured. The results obtained are shown in Table 2 below.

TABLE 2

| Sample No. | Surface Resistivity (kΩ/square) | TCR (ppm/°C.) | |
|---|---|---|---|
| | | +150° C. | −55° C. |
| 1* | 1.5 | −350 | −425 |
| 2 | 1.7 | −285 | −330 |
| 3 | 2.3 | −215 | −260 |
| 4* | 15 | −405 | −460 |
| 5 | 1.6 | −275 | −310 |
| 6 | 2.1 | −205 | −240 |
| 7 | 1.7 | −215 | −250 |
| 8 | 3.1 | −325 | −385 |
| 9 | 53 | −400 | −435 |
| 10 | 7.1 | −320 | −345 |
| 11 | 4.3 | −265 | −295 |
| 12 | 2.7 | −245 | −295 |
| 13 | 34 | −315 | −370 |
| 14* | 535 | −730 | −775 |
| 15* | 127 | −520 | −585 |
| 16 | 142 | −335 | −370 |
| 17 | 187 | −295 | −330 |
| 18* | 630 | −535 | −590 |
| 19 | 130 | −405 | −445 |
| 20 | 133 | −270 | −305 |

TABLE 2-continued

| Sample No. | Surface Resistivity (kΩ/square) | TCR (ppm/°C.) | |
|---|---|---|---|
| | | +150° C. | −55° C. |
| 21 | 148 | −385 | −425 |
| 22 | 235 | −470 | −510 |
| 23 | 539 | −385 | −420 |
| 24 | 893 | −495 | −520 |
| 25 | 612 | −380 | −435 |
| 26 | 441 | −302 | −375 |
| 27 | 713 | −415 | −465 |
| 28* | 1 GΩ | unmeasurable | unmeasurable |

Note:
*: Samples out of the scope of the present invention.

It can be seen from Table 2 that Sample No. 1 containing no additive in accordance with the conventional technique (x=0.25 mol) had TCR of −350 ppm/° C. and −425 ppm/° C. and similarly Sample No. 15 (x=0.75 mol) had TCR of −520 ppm/° C. and −585 ppm while samples containing 1 to 10% of the additive selected from $B_2O_3$, $SiO_2$, $Al_2O_3$, CrB, NiB, $TaSi_2$, and Ta (Sample Nos. 2, 3, 5 to 11 and 16, 17, and 19 to 25) had TCR shifted to the plus (+) direction as compared with Sample Nos. 1 or 15. It is also apparent that Sample Nos. 4 and 18 containing more than 10% of these additives show little improvement in TCR.

Further, it can be seen that Sample Nos. 12, 13 and 26 and 27 containing from 5 to 25% of AlN as an additive also have TCR shifted to the plus (+) direction as compared with Sample Nos. 1 and 15. Samples Nos. 14 and 28 containing more than 25% of AlN show little improvement in TCR.

As described and demonstrated above, the resistive paste according to the present invention comprises a mixture of a resistive material having a composition of $Nb_xLa_{1-x}B_{6-4x}$ (x=0.1 to 0.9 mol) and non-reducing glass frit and further contains at least one additive selected from the group consisting of $B_2O_3$, $SiO_2$, $Al_2O_3$, CrB, NiB, $TaSi_2$, and Ta in an amount of from 1 to 10% by weight based on the mixture or AlN in an amount of from 5 to 25% by weight based on the mixture. According to the present invention, it is possible to shift the temperature coefficient of surface resistivity in a high resistivity range of a resistor formed by baking an $Nb_xLa_{1-x}B_{6-4x}$-based resistive paste to the plus (+) direction so that the resistive paste of the present invention sufficiently satisfies the characteristics required for a resistive paste to be based in a neutral or reducing atmosphere.

While the invention has been described in detail and with reference to specific examples thereof, it will be apparent to one skilled in the art that various changes and modifications can be made therein without departing from the spirit and scope thereof.

What is claimed is:

1. A resistive paste comprising (a) a mixture of a resistive material having a composition of $Nb_xLa_{1-x}B_{6-4x}$, wherein x is from 0.1 to 0.9 mol, and non-reducing glass frit, (b) AlN in an amount of from 5 to 25% by weight based on said mixture (a), and (c) an organic vehicle.

2. A resistive paste according to claim 1, containing AlN in an amount from 10 to 20% by weight based on said mixture (a).

3. A resistive paste according to claim 2, in which the weight ratio of the resistive material to the glass frit is from 5/100 to 70/100.

4. A resistive paste according to claim 1, in which x is from 0.2 to 0.8 mol.

5. A resistive paste according to claim 3, in which x is 0.2 to 0.8 mol.

* * * * *